United States Patent
Goto

(10) Patent No.: US 12,475,721 B2
(45) Date of Patent: Nov. 18, 2025

(54) TRAVEL ENVIRONMENT RECOGNITION APPARATUS

(71) Applicant: Honda Motor Co., Ltd., Tokyo (JP)

(72) Inventor: Yuhi Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 18/103,242

(22) Filed: Jan. 30, 2023

(65) Prior Publication Data

US 2023/0260293 A1    Aug. 17, 2023

(30) Foreign Application Priority Data

Feb. 14, 2022    (JP) .................................. 2022-020192

(51) Int. Cl.
 *G06V 20/56*    (2022.01)
 *G06V 10/98*    (2022.01)

(52) U.S. Cl.
 CPC ............ G06V 20/588 (2022.01); G06V 10/98 (2022.01); *G06T 2207/30256* (2013.01)

(58) Field of Classification Search
 CPC ...... G06V 20/588; G06V 10/98; G06V 20/58; G06V 20/56; G06V 20/647; G06T 7/80; G06T 2207/30252; G06T 2207/30256; G06T 2207/30244; G01S 2013/9322; G05D 1/628; G01C 21/3658; B60G 2800/019; B60G 2800/014; B60W 40/076
 See application file for complete search history.

(56) References Cited

U.S. PATENT DOCUMENTS

| | | | | |
|---|---|---|---|---|
| 2009/0043473 A1* | 2/2009 | Nakai | ................. | B60W 40/076 701/70 |
| 2010/0238283 A1* | 9/2010 | Kim | ......................... | G06T 7/73 348/135 |
| 2011/0238252 A1* | 9/2011 | Takeda | ................. | G06V 20/588 348/148 |
| 2013/0141580 A1* | 6/2013 | Stein | ................... | B60W 40/076 348/148 |
| 2015/0161456 A1* | 6/2015 | Chevalley | ............ | H04N 23/683 348/148 |
| 2016/0068165 A1* | 3/2016 | Chen | ................... | B60W 40/076 701/32.9 |

(Continued)

FOREIGN PATENT DOCUMENTS

| | | |
|---|---|---|
| JP | 2010002334 A | 1/2010 |
| JP | 6845124 B2 | 3/2021 |

OTHER PUBLICATIONS

Chinese Office action; Application 202310118497.6; 16 pages; Aug. 23, 2025.

*Primary Examiner* — Matthew C Bella
*Assistant Examiner* — Nicholas John Helco
(74) *Attorney, Agent, or Firm* — Duft & Bornsen, PC

(57) ABSTRACT

A travel environment recognition apparatus includes: an external situation detection unit configured to detect an external situation around a subject vehicle; a state detection unit configured to detect a state of the subject vehicle; a microprocessor and a memory coupled to the microprocessor. The microprocessor is configured to perform: recognizing a travel environment in front of the subject vehicle based on a detection value of the external situation detection unit; and correcting a recognition result of the environment recognition unit based on the detection value of the state detection unit.

4 Claims, 6 Drawing Sheets

(56) References Cited

U.S. PATENT DOCUMENTS

| | | | | |
|---|---|---|---|---|
| 2016/0148059 A1* | 5/2016 | Kawano | ............... | G06V 20/588 |
| | | | | 382/104 |
| 2018/0204075 A1* | 7/2018 | Kumano | ............... | G06V 20/588 |
| 2019/0092336 A1* | 3/2019 | Czarnecki | ............ | B60W 10/184 |
| 2019/0263391 A1* | 8/2019 | Matsunaga | ............ | B60W 40/06 |
| 2021/0370913 A1* | 12/2021 | Yang | ...................... | B60W 10/11 |
| 2021/0370937 A1* | 12/2021 | Park | .................... | B60W 40/105 |

\* cited by examiner

TRAVEL ENVIRONMENT RECOGNITION APPARATUS

CROSS-REFERENCE TO RELATED APPLICATION

This application is based upon and claims the benefit of priority from Japanese Patent Application No. 2022-020192 filed on Feb. 14, 2022, the content of which are incorporated herein by reference.

BACKGROUND OF THE INVENTION

Field of the Invention

This invention relates to a travel environment recognition apparatus for recognizing a travel environment of a vehicle.

Description of the Related Art

As this type of apparatus, there has been conventionally known an apparatus that estimates a three-dimensional structure of a boundary line of a traveling path of a subject vehicle based on a captured image of an area in front of the subject vehicle, and performs traveling path recognition in consideration of a gradient change based on the estimation result (see, for example, Japanese Patent No. 6845124).

However, in a case where the three-dimensional structure of the boundary line is estimated based on the captured image as in the apparatus described in Japanese Patent No. 6845124, complicated calculation processing and image processing are required, and there is a possibility that a processing load associated with the traveling path recognition increases.

SUMMARY OF THE INVENTION

An aspect of the present invention is a travel environment recognition apparatus including: an external situation detection unit configured to detect an external situation around a subject vehicle; a state detection unit configured to detect a state of the subject vehicle; a microprocessor and a memory coupled to the microprocessor; and the microprocessor is configured to perform: recognizing a travel environment in front of the subject vehicle based on a detection value of the external situation detection unit; and correcting a recognition result of the environment recognition unit based on the detection value of the state detection unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1A to 5. A vehicle control apparatus according to the embodiment of the present invention can be applied to a vehicle having a self-driving capability, that is, a self-driving vehicle. Note that the vehicle control apparatus according to the embodiment of the present invention is applicable to both a manual driving vehicle and a self-driving vehicle having a driving support capability, but for convenience of description, a case where the vehicle control apparatus is applied to the self-driving vehicle will be described below as an example. In addition, a vehicle to which the vehicle control apparatus according to the present embodiment is applied may be referred to as a subject vehicle to be distinguished from other vehicles. The subject vehicle may be any of an engine vehicle having an internal combustion engine (engine) as a traveling drive source, an electric vehicle having a traveling motor as a traveling drive source, and a hybrid vehicle having an engine and a traveling motor as traveling drive sources. The subject vehicle can travel not only in a self-drive mode in which a driving operation by a driver is unnecessary, but also in the manual drive mode by the driving operation by the driver.

Figure 1A:
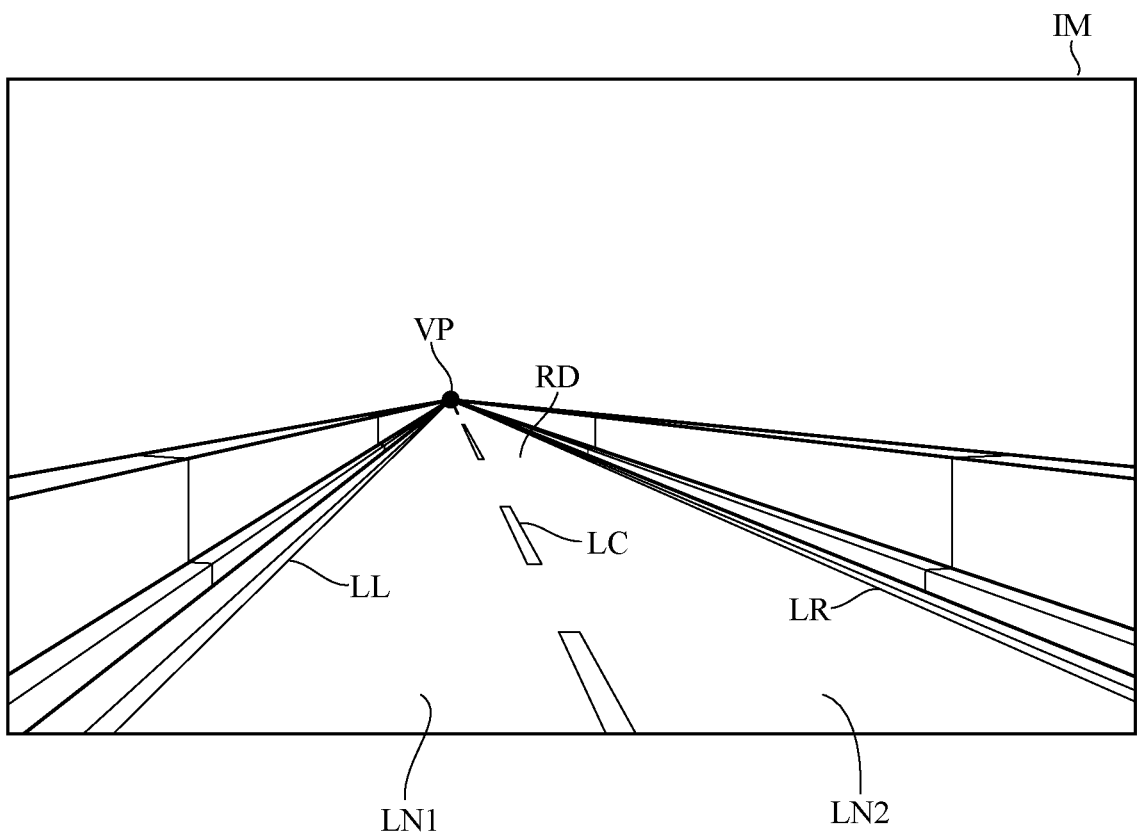
FIG. 1A is a diagram illustrating an example of a captured image of an area in front of a subject vehicle.
Figure 1B:
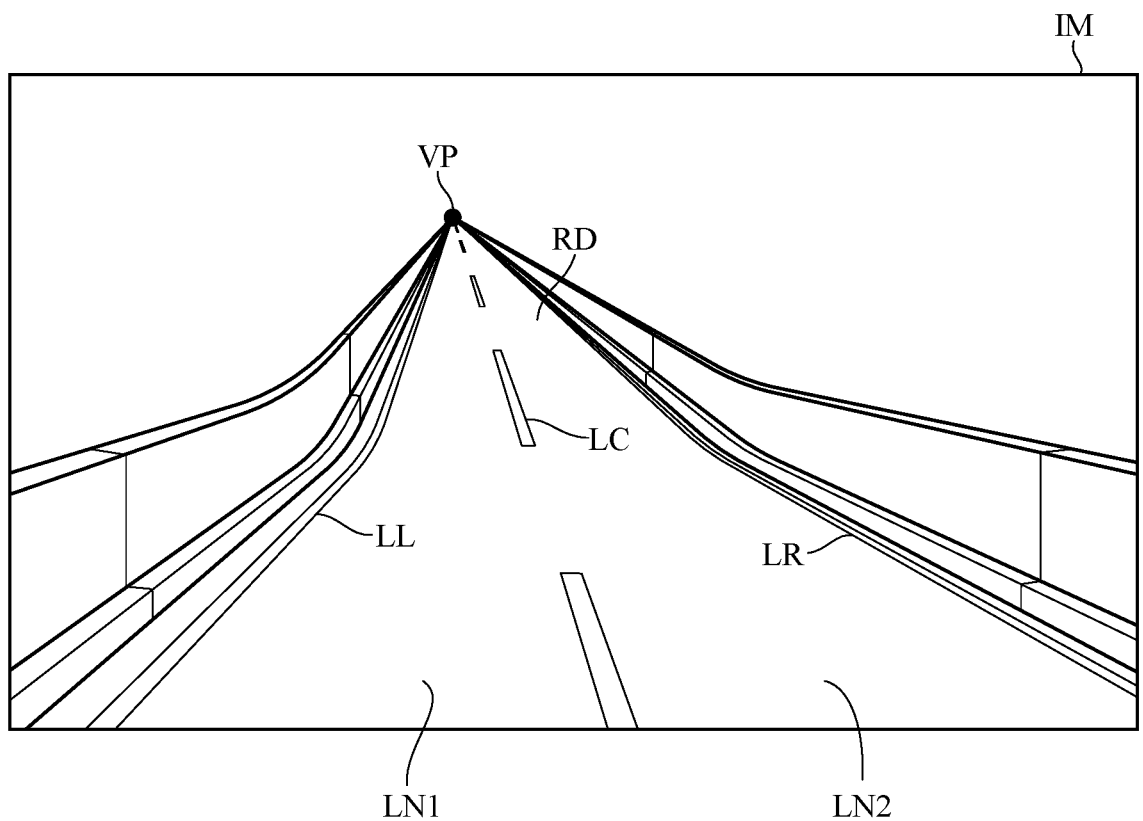
FIG. 1B is a diagram illustrating an example of another captured image of an area in front of a subject vehicle.
Figure 1C:
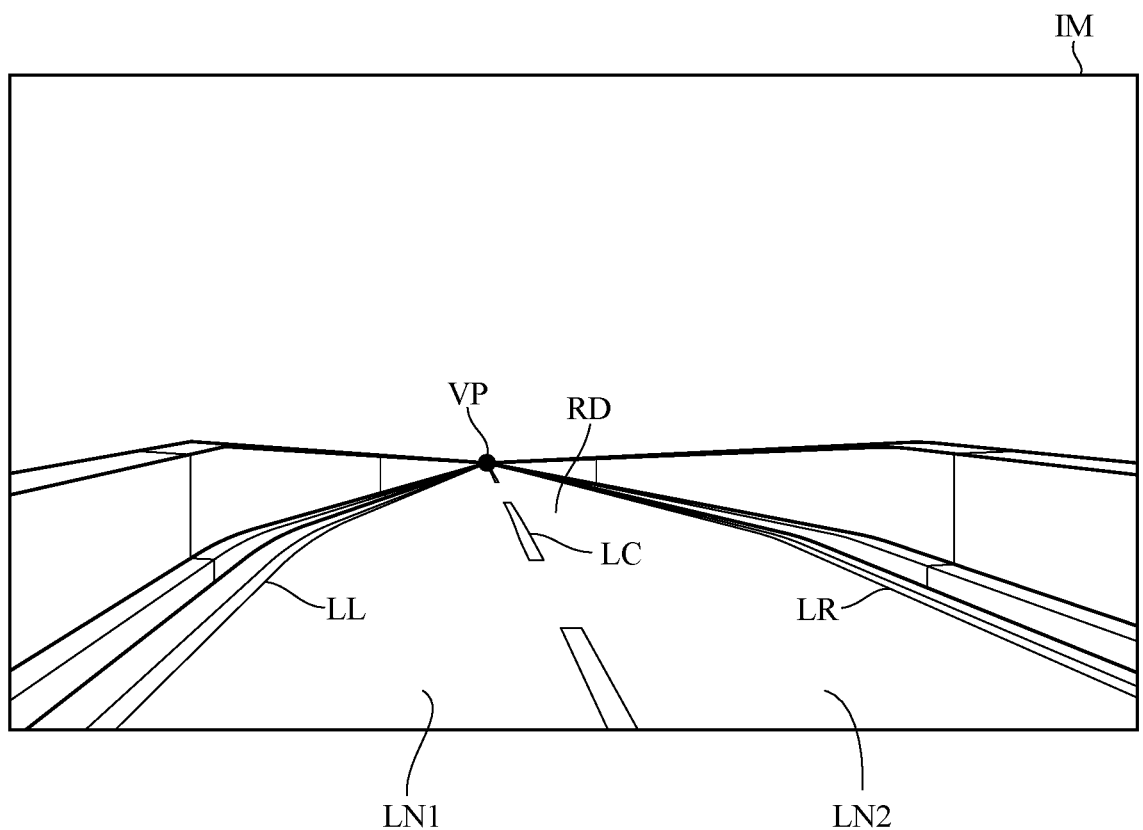
FIG. 1C is a diagram illustrating an example of another captured image of an area in front of a subject vehicle.

When the self-driving capability is enabled, the self-driving vehicle recognizes a division line that defines a current lane based on image data (hereinafter, it is referred to as captured image data or simply as a captured image) obtained by an imaging unit installed in a predetermined part (for example, an upper part of a windshield) of the subject vehicle, and controls a traveling actuator so that the subject vehicle travels near the center of the current lane based on information of the recognized division line. FIGS. 1A to 1C are diagrams illustrating examples of captured images of an area ahead in a traveling direction obtained by an imaging unit of a subject vehicle traveling on a left lane LN1 of a road RD of two lanes on one side (lanes LN1 and LN2) of left-hand traffic.

FIG. 1A illustrates an example of a captured image obtained when the subject vehicle is traveling at a point where there is no gradient of a road surface. As illustrated in FIG. 1A, ends of division lines LL, LR, and LC of the road on which the subject vehicle travels intersect each other at one point on the captured image. Hereinafter, this point is referred to as a vanishing point. In FIG. 1A, a vanishing point VP is schematically superimposed and displayed on a captured image IM. The subject vehicle controls the traveling actuator so that the subject vehicle travels on a target path that is a line connecting a vehicle tip to the vanishing point VP so as to pass through the center of the division lines LL and LC that define the current lane. As a result, the subject vehicle can automatically travel in the current lane satisfactorily. The target path is a driving path from the current point of time to a predetermined time ahead.

FIG. 1B illustrates an example of a captured image obtained by the imaging unit while the subject vehicle is traveling at a point where an uphill exists ahead in the traveling direction. FIG. 1C illustrates an example of a captured image obtained by the imaging unit while the subject vehicle is traveling at a point where a downhill exists ahead in the traveling direction. The gradient of the road surface in front (more specifically, a position away from the subject vehicle in the traveling direction to some extent) of the subject vehicle can be recognized based on the position of the vanishing point VP on the captured image. For example, in a case where the captured image as illustrated in FIG. 1B is obtained, since the vanishing point VP is located higher than the captured image in FIG. 1A, it is possible to recognize that the front of the subject vehicle is in an ascending gradient. Meanwhile, in a case where the captured image as illustrated in FIG. 1C is obtained, since the vanishing point VP is lower than the captured image in FIG. 1A, it can be recognized that the front of the subject vehicle has a downward gradient.

In a case where it is difficult to recognize the gradient of the road surface in the vicinity of the traveling direction from the subject vehicle based on the position of the vanishing point VP on the captured image and the captured image as illustrated in FIGS. 1B and 1C is obtained, there is a possibility that the recognition result of the gradient of the road surface in the vicinity of the subject vehicle is different from the actual gradient of the road surface. Since the position and the shape of the division line change depending on the gradient of the road surface, when the gradient of the road surface cannot be accurately recognized, recognition accuracy of the division line also decreases accordingly. As a result, there is a possibility that the target path is not appropriately generated and the automatic traveling cannot be performed satisfactorily. In this regard, as in the apparatus described in Japanese Patent No. 6845124, it is also possible to improve the recognition accuracy of the division line by estimating the three-dimensional structure of the division line based on the captured image. However, the division line recognition requires complicated calculation processing and image processing, and thus increases a processing load. Therefore, in order to cope with such a problem, in the present embodiment, a vehicle control apparatus is configured as follows.

Figure 2:
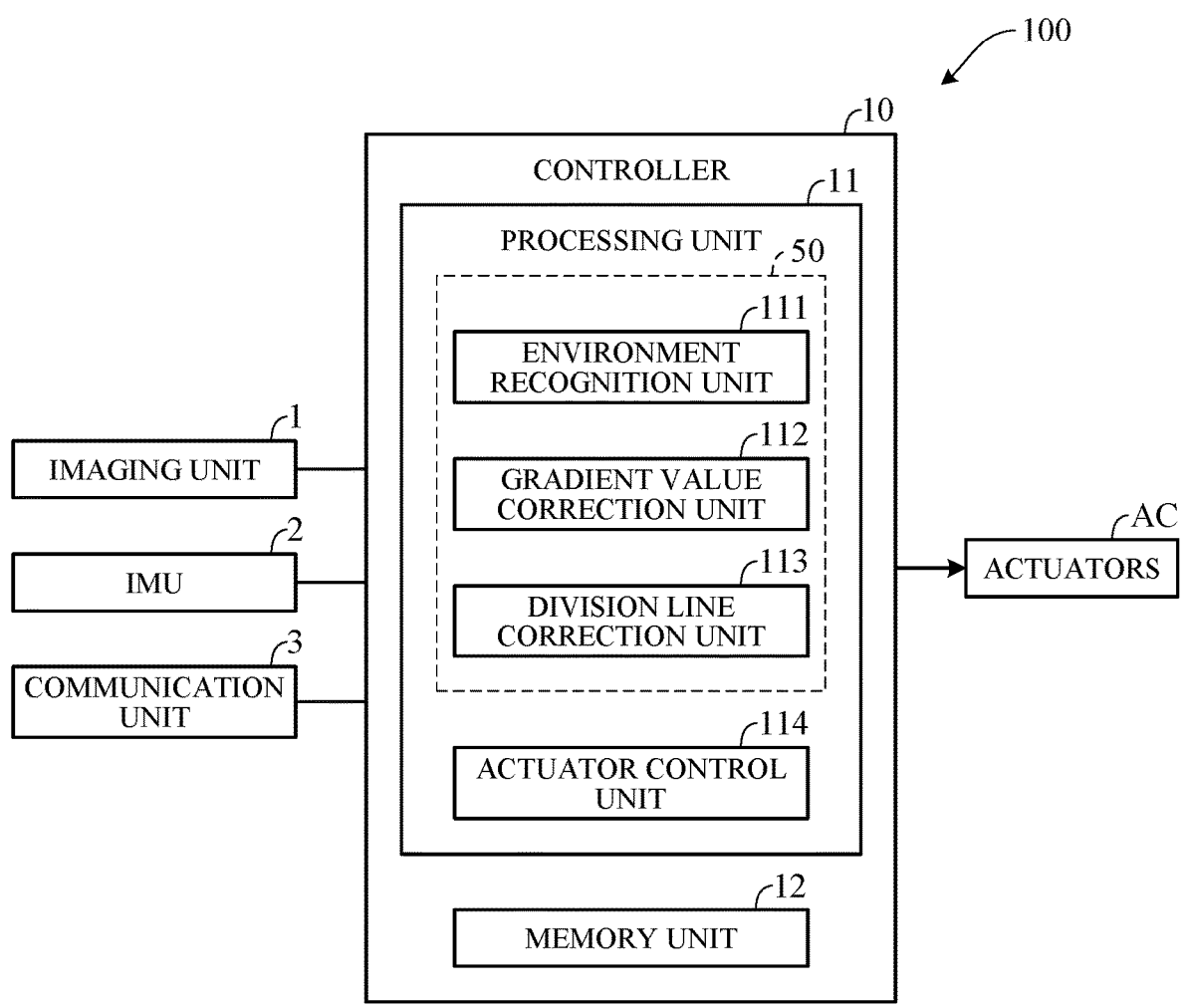
FIG. 2 is a block diagram schematically illustrating a main configuration of a vehicle control apparatus according to an embodiment of the present invention.

FIG. 2 is a block diagram schematically illustrating a main configuration of a vehicle control apparatus 100 according to the embodiment of the present invention. As illustrated in FIG. 2, the vehicle control apparatus 100 includes a controller 10, an imaging unit 1 communicably connected to the controller 10, an inertial measurement unit (IMU) 2, a communication unit 3, and an actuator AC.

In addition, the vehicle control apparatus 100 includes a travel environment recognition apparatus 50 constituting a part of the vehicle control apparatus 100. The travel environment recognition apparatus 50 recognizes a travel environment of a subject vehicle 101.

The imaging unit 1 includes an imaging element (image sensor) such as a CCD or a CMOS. The imaging unit 1 images a predetermined area around the subject vehicle. Specifically, the imaging unit 1 is attached to a predetermined part (such as upper part of windshield) of the subject vehicle, and continuously images the space in front of the subject vehicle to acquire image data. The imaging unit 1 may be a monocular camera or a stereo camera.

The IMU 2 detects the state of the subject vehicle 101. Specifically, the IMU 2 detects acceleration and angular velocity acting on the subject vehicle 101. The IMU 2 can further detect an attitude angle (hereinafter, it is simply referred to as an "attitude angle of the subject vehicle") of the subject vehicle 101 in a front-rear direction with respect to the road surface. Note that the IMU may be capable of detecting attitude angles other than the front-rear direction, for example, attitude angles in an up-down direction and a left-right direction.

The communication unit 3 communicates with various apparatuses (not illustrated) via a network including a wireless communication network represented by the Internet network, a mobile phone network, or the like. The network includes not only a public wireless communication network but also a closed communication network provided for each predetermined management region, for example, a wireless LAN, Wi-Fi (registered trademark), Bluetooth (registered trademark), and the like.

The actuator AC includes a throttle actuator, and a traveling actuator such as a shift actuator, a brake actuator, and a steering actuator.

The controller 10 includes an electronic control unit (ECU). More specifically, the controller 10 includes a computer including a processing unit 11 such as a CPU (microprocessor), a memory unit 12 such as a ROM and a RAM, and other peripheral circuits (not illustrated) such as an I/O interface. Although a plurality of ECUs having different functions such as an engine control ECU, a traveling motor control ECU, and a braking device ECU can be separately provided, in FIG. 2, the controller 10 is illustrated as a set of these ECUs for convenience.

The memory unit 12 stores information such as programs for various types of control and thresholds used in the programs. The processing unit 11 includes, as functional configurations, an environment recognition unit 111, a gradient value correction unit (hereinafter, also simply referred to as a correction unit) 112, a division line correction unit 113, and an actuator control unit 114. As illustrated in FIG. 2, the environment recognition unit 111, the gradient value correction unit 112, and the division line correction unit 113 are included in the travel environment recognition apparatus 50.

The environment recognition unit 111 recognizes the division line included in an imaging range based on the captured image of the imaging unit 1. Specifically, the environment recognition unit 111 stores, in the memory unit 12, information including a recognition result (hereinafter, referred to as a virtual division line) of the division line that defines each lane of the road on which the subject vehicle 101 travels.

The environment recognition unit 111 further calculates a position on the captured image of a vanishing point where two virtual division lines corresponding to two division lines that define the current lane intersect with each other. Note that the position of the vanishing point is not limited to the current lane, and may be calculated to include a virtual division line corresponding to a division line that defines another lane. For example, when the subject vehicle 101 is traveling on a road having three lanes on each side, the position of a point at which virtual division lines corresponding to four division lines defining the three lanes intersect each other may be calculated. Further, when a distant point where the division line intersects cannot be recognized due to occlusion or the like by a forward vehicle, the division line (virtual division line) that cannot be recognized far may be extended to a position where the division line intersects another division line. Then, the position of the point where the plurality of virtual division lines including the extended virtual division line intersect with each other may be calculated as the position of the vanishing point. The environment recognition unit 111 recognizes a road gradient of a travel route to the vanishing point of the subject vehicle 101 based on the position of the vanishing point on the captured image, and calculates the gradient value.

The gradient value correction unit 112 corrects the gradient value calculated by the environment recognition unit 111 based on the detection data of the IMU 2. Specifically, the gradient value correction unit 112 corrects the road gradient (gradient value) of the travel route of the subject vehicle 101 recognized based on the captured image of the imaging unit 1 based on the attitude angle of the subject vehicle 101 detected by the IMU 2, that is, a pitch angle of the subject vehicle 101.

Figure 3A:
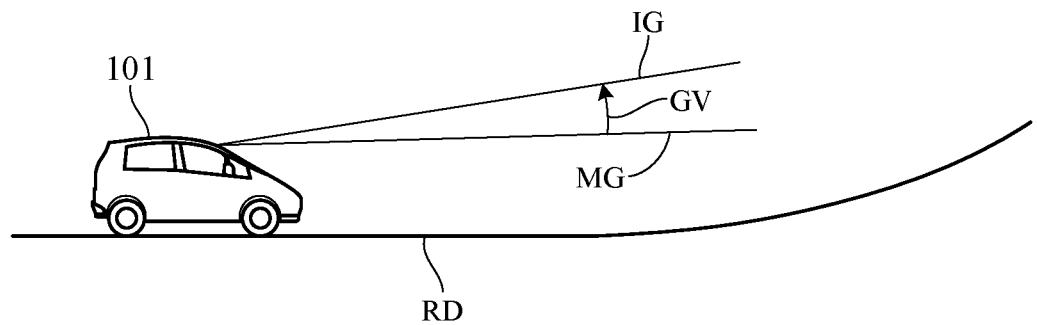
FIG. 3A is a diagram for explaining correction of a road gradient when a road ahead of the subject vehicle is in an ascending gradient.
Figure 3B:
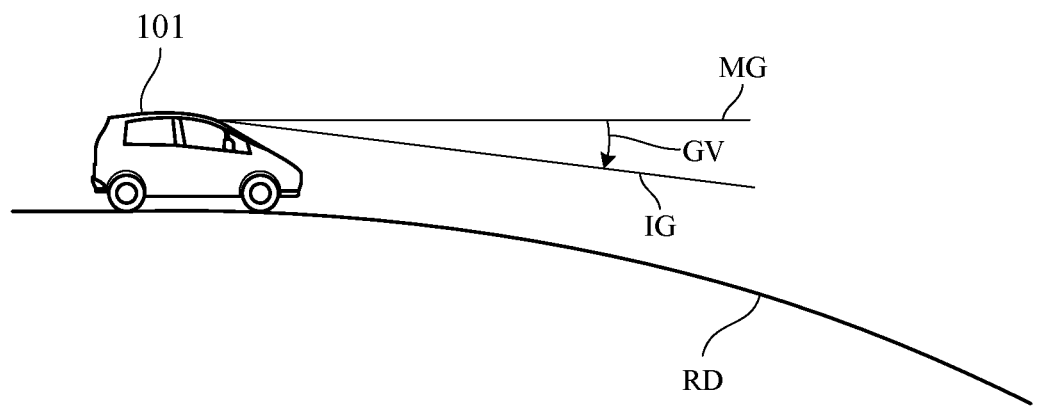
FIG. 3B is a diagram for explaining correction of a road gradient when a road ahead of the subject vehicle is in a downward gradient.

Here, correction of the road gradient will be described with reference to FIGS. 3A and 3B. FIG. 3A is a diagram for explaining correction of a road gradient when a road ahead of the subject vehicle is in an ascending gradient. FIG. 3B is a diagram for explaining correction of a road gradient when a road ahead of the subject vehicle is in a downward gradient. A solid line IG is a line connecting the vanishing point where two virtual division lines corresponding to division lines that define current lane intersect each other and a traveling position of the subject vehicle 101 (an installation position of imaging unit 1). The solid line IG schematically represents the road gradient recognized by the environment recognition unit 111 based on the captured image of the imaging unit 1, and an inclination angle of the solid line IG with respect to a horizontal direction (left-right direction in the drawing) corresponds to the gradient value. A solid line MG schematically represents the pitch angle of the subject vehicle 101 detected by the IMU 2, that is, the inclination in the front-rear direction with respect to the road surface of the subject vehicle 101.

The gradient value correction unit 112 corrects the road gradient IG recognized from the captured image based on the pitch angle of the subject vehicle 101 detected by the IMU 2. Specifically, first, the gradient value correction unit 112 calculates an angle difference GV by subtracting the pitch angle MG from the inclination angle of the road gradient IG. Hereinafter, the angle difference GV is referred to as a maximum gradient change amount. The maximum gradient change amount GV is a positive value in the example of FIG. 3A, and is a negative value in the example of FIG. 3B. Subsequently, the gradient value correction unit 112 gradually adds a height (change amount) to the pitch angle of the subject vehicle 101 with a predetermined resolution as the subject vehicle 101 moves away from a current position in the traveling direction, and determines the corrected road gradient so that a lane width (width between the division lines defining the current lane) at each position (position in the traveling direction) to which the height is added falls within a certain error range. The error range is a difference from a lane width near the subject vehicle, that is, at a position (hereinafter, referred to as a reference position) where an error (a recognition error of the division line caused by the road gradient) is assumed to be the smallest. Such correction of the road gradient can also be applied to an adjacent lane.

Figure 4:
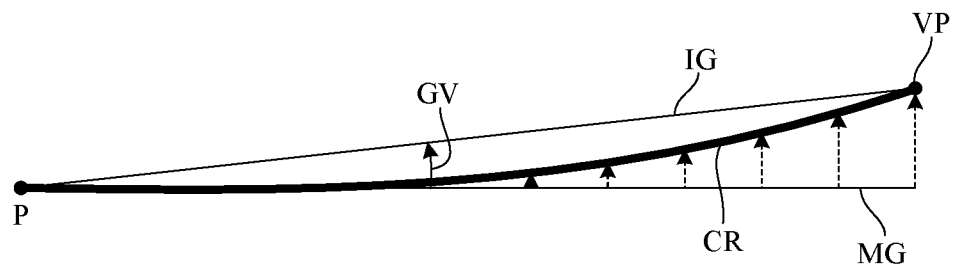
FIG. 4 is a diagram illustrating an example of a corrected road gradient.

FIG. 4 is a diagram illustrating an example of a corrected road gradient determined by the gradient value correction unit 112 at the time of FIG. 3A. As illustrated in FIG. 4, the gradient value correction unit 112 applies the height with a predetermined resolution until the change amount (change amount based on the pitch angle MG of the subject vehicle 101) of the road gradient reaches the maximum gradient change amount GV. A length of a broken line arrow in the drawing represents a height set with the predetermined resolution, and a position of the broken line arrow represents a set position of the height. The point P represents the current position of the subject vehicle 101 (more precisely, the imaging unit 1). A thick line CR represents the corrected road gradient. When the road ahead of the subject vehicle is in a downward gradient as shown in FIG. 3B, the corrected road gradient is determined in a similar manner. In addition, in the example illustrated in FIG. 4, the set positions of the heights are arranged at equal intervals in the traveling direction, but the positions where the heights are set and the intervals thereof are not limited thereto. In addition, FIG. 4 illustrates an example in which the change amount of the road gradient becomes the maximum gradient change amount at the position of the vanishing point. However, there is a case where the change amount of the road gradient reaches the maximum gradient change amount at a position before the vanishing point VP, or there is a case where the change amount of the road gradient does not reach the maximum gradient change amount because the division line near the vanishing point VP is not visible.

The division line correction unit 113 corrects the recognition result of the division line by the environment recognition unit 111, that is, the virtual division line, based on the corrected road gradient determined by the gradient value correction unit 112. Specifically, the division line correction unit 113 determines the height (position coordinates in the Z-axis direction based on the pitch angle MG of the subject vehicle 101) of the virtual division line at each position based on the height set at each position. As a result, position and shape of the virtual division line are corrected so as to correspond to the road gradient.

The actuator control unit 114 generates a target path based on the virtual division line corrected by the division line correction unit 113. More specifically, a line (route) connecting the current traveling position of the subject vehicle 101 to a vanishing point where the corrected virtual division lines intersect each other is generated as the target path so as to pass through the center of the corrected virtual division line. The actuator control unit 114 controls the actuator AC so that the subject vehicle 101 travels along the target path. As a result, the subject vehicle 101 can automatically travel in the vicinity of the center of the current lane in a preferable manner even in a travel environment where the road gradient changes.

Figure 5:
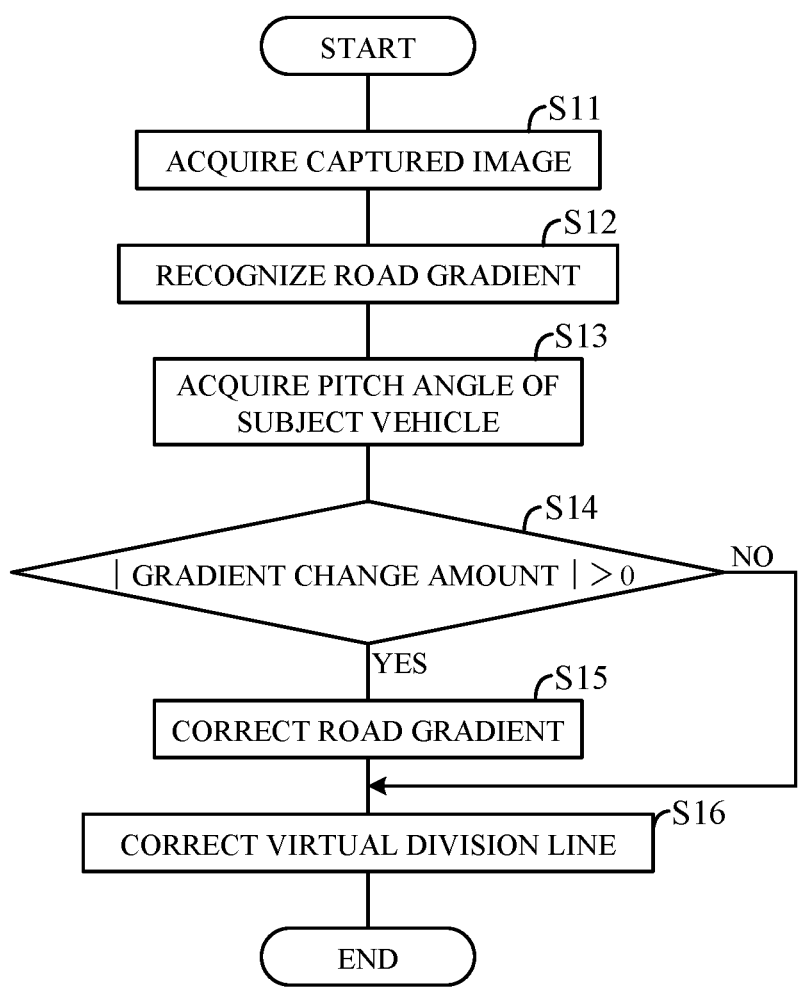
FIG. 5 is a flowchart illustrating an example of processing executed by the CPU of the controller of FIG. 2.

FIG. 5 is a flowchart illustrating an example of processing executed by the CPU of the controller 10 of FIG. 2 according to a program stored in advance. The processing illustrated in the flowchart is executed, for example, at a predetermined cycle while the subject vehicle is traveling in the self-drive mode.

First, in Step S11, the captured image obtained by the imaging unit 1 is acquired. In Step S12, the division line included in the imaging range is recognized based on the captured image, and further, the road gradient of the travel route of the subject vehicle 101 is recognized based on the recognition result (virtual division line).

In Step S13, the pitch angle of the subject vehicle 101 is acquired based on the detection data of the IMU 2. In Step S14, it is determined whether or not the absolute value of the angle difference (maximum gradient change amount) obtained by subtracting the pitch angle of the subject vehicle 101 from the road gradient (gradient value) recognized in Step S12 is larger than 0.

When a negative determination is made in Step S14, the processing ends When affirmative determination is made in Step S14, the recognition result (road gradient) in Step S12 is corrected based on the maximum gradient change amount calculated in Step S14 in Step S15. In Step S16, the virtual division line obtained in Step S12 is corrected using the corrected road gradient.

According to the present embodiment, the following operational effects can be achieved.

(1) The travel environment recognition apparatus 50 includes the imaging unit 1 that detects an external situation around the subject vehicle 101, the IMU 2 that detects the state of the subject vehicle 101, the environment recognition unit 111 that recognizes the travel environment in front of the subject vehicle 101 based on the captured image data of the imaging unit 1, and the gradient value correction unit 112 that corrects the recognition result of the environment recognition unit 111 based on the detection value of the IMU 2. This makes it possible to accurately recognize the travel environment ahead in the traveling direction of the subject vehicle 101. In addition, since the recognition result of the travel environment is corrected based on the detection value of the IMU 2, complicated calculation processing and image processing are unnecessary, and an increase in processing load can be suppressed.

(2) The IMU 2 detects the attitude angle of the subject vehicle 101 as the state of the subject vehicle 101. The environment recognition unit 111 recognizes the road gradient in front of the subject vehicle 101, and the gradient value correction unit 112 corrects the value of the road gradient recognized by the environment recognition unit 111 based on the attitude angle of the subject vehicle 101 detected by the IMU 2. The attitude angle of the subject vehicle 101 detected by the IMU 2 is the attitude angle of the subject vehicle 101 in the front-rear direction with respect to the road surface. As a result, it is possible to accurately recognize the road gradient of the travel route of the subject vehicle 101 including the road gradient in the vicinity of the traveling direction that is difficult to recognize only by the captured image. Therefore, when the attitude of the subject vehicle 101 in the front-rear direction is not horizontal, for example, when the subject vehicle 101 is traveling on a downhill, even though an upward slope exists in front of the subject vehicle, the road gradient of the traveling route of the subject vehicle 101 can be accurately recognized.

(3) The environment recognition unit 111 further recognizes the division line that defines the lane of a road on which the subject vehicle 101 travels based on the captured image data of the imaging unit 1. The travel environment recognition apparatus 50 further includes the division line correction unit 113 that corrects the recognition result of the division line by the environment recognition unit 111 based on the road gradient value corrected by the gradient value correction unit 112. As a result, it is possible to accurately recognize the division line even when the vehicle is traveling on a road where the gradient of the road surface changes. In addition, in the self-drive mode, by controlling the traveling actuator based on the division lines recognized in this way, good self-driving can be performed, and traffic safety can be improved.

The above embodiment can be modified into various forms. Some modifications will be described below. In the above embodiment, the imaging unit 1 detects the external situation around the subject vehicle as the external environment detection unit. However, the external environment detection unit may be other than the imaging unit (camera), and may be a radar or a LiDAR. Furthermore, in the above embodiment, the vehicle control apparatus 100 including one imaging unit as the external environment detection unit has been described as an example, but the vehicle control apparatus may include a plurality of external environment detection units. In the above embodiment, the IMU 2 detects the state of the subject vehicle 101 as the state detection unit. However, the state detection unit only needs to be able to detect at least the attitude angle of the subject vehicle 101, and may include other devices.

Furthermore, in the above embodiment, the environment recognition unit 111 recognizes the traveling environment in front of the subject vehicle 101 in the traveling direction based on the captured image obtained by the imaging unit 1. However, the environment recognition unit may recognize the traveling environment ahead in the traveling direction of the subject vehicle 101 by further using information obtained by road-to-vehicle communication or vehicle-to-vehicle communication via the communication unit 3.

Furthermore, in the above-described embodiment, the environment recognition unit 111 recognizes the division line that defines the lane of the road on which the subject vehicle 101 travels based on the captured image data of the imaging unit 1. However, the environment recognition unit may recognize the division line based on, for example, the detection value of the LiDAR.

In the above embodiment, when the absolute value of the maximum gradient change amount is larger than 0, the road gradient is corrected (S14 and S15). However, the road gradient may be corrected when the absolute value of the maximum gradient change amount is a predetermined value or more. Furthermore, in the above embodiment, an example has been described in which the vehicle control apparatus is applied to a self-driving vehicle having a lane keeping capability as one of the self-driving capabilities, but the present invention can be similarly applied to a manual driving vehicle having a lane keeping capability or the like as one of the driving support capabilities.

The above embodiment can be combined as desired with one or more of the above modifications. The modifications can also be combined with one another.

According to the present invention, it is possible to accurately recognize a travel environment of a vehicle without increasing a processing load.

Above, while the present invention has been described with reference to the preferred embodiments thereof, it will be understood, by those skilled in the art, that various changes and modifications may be made thereto without departing from the scope of the appended claims.

What is claimed is:

1. A travel environment recognition apparatus comprising:
   an external situation detection unit configured to detect an external situation around a subject vehicle;
   a state detection unit configured to detect an attitude angle of the subject vehicle; and
   a microprocessor and a memory coupled to the microprocessor;
   the microprocessor is configured to perform:
   recognizing a gradient of a road in front of the subject vehicle and division lines defining a lane of the road on which the subject vehicle travels based on a detection value of the external situation detection unit;
   correcting a value of the gradient based on the attitude angle of the subject vehicle, and so that lane widths defined by the division lines at a plurality of positions in a traveling direction of the subject vehicle fall within a certain error range with respect to a lane width defined by the division lines recognized at a reference position among the plurality of positions; and
   correcting a recognition result of the division lines based on the corrected value of the gradient.

2. The travel environment recognition apparatus according to claim 1, wherein
the attitude angle of the subject vehicle is an attitude angle of the subject vehicle in a front-rear direction with respect to a surface of the road.

3. A travel environment recognition apparatus comprising:
an external situation detection unit configured to detect an external situation around a subject vehicle;
a state detection unit configured to detect an attitude angle of the subject vehicle; and
a microprocessor and a memory coupled to the microprocessor;
the microprocessor is configured to function as:
an environment recognition unit that recognizes a gradient of a road in front of the subject vehicle and division lines defining a lane of the road on which the subject vehicle travels based on a detection value of the external situation detection unit;
a gradient value correction unit that corrects a value of the gradient based on the attitude angle of the subject vehicle, and so that lane widths defined by the division lines at a plurality of positions in a traveling direction of the subject vehicle fall within a certain error range with respect to a lane width defined by the division lines recognized at a reference position among the plurality of positions; and
a division line correction unit that corrects a recognition result of the division lines based on the corrected value of the gradient.

4. The travel environment recognition apparatus according to claim 3, wherein
the attitude angle of the subject vehicle is an attitude angle of the subject vehicle in a front-rear direction with respect to a surface of the road.

\* \* \* \* \*